United States Patent Office 3,736,221
Patented May 29, 1973

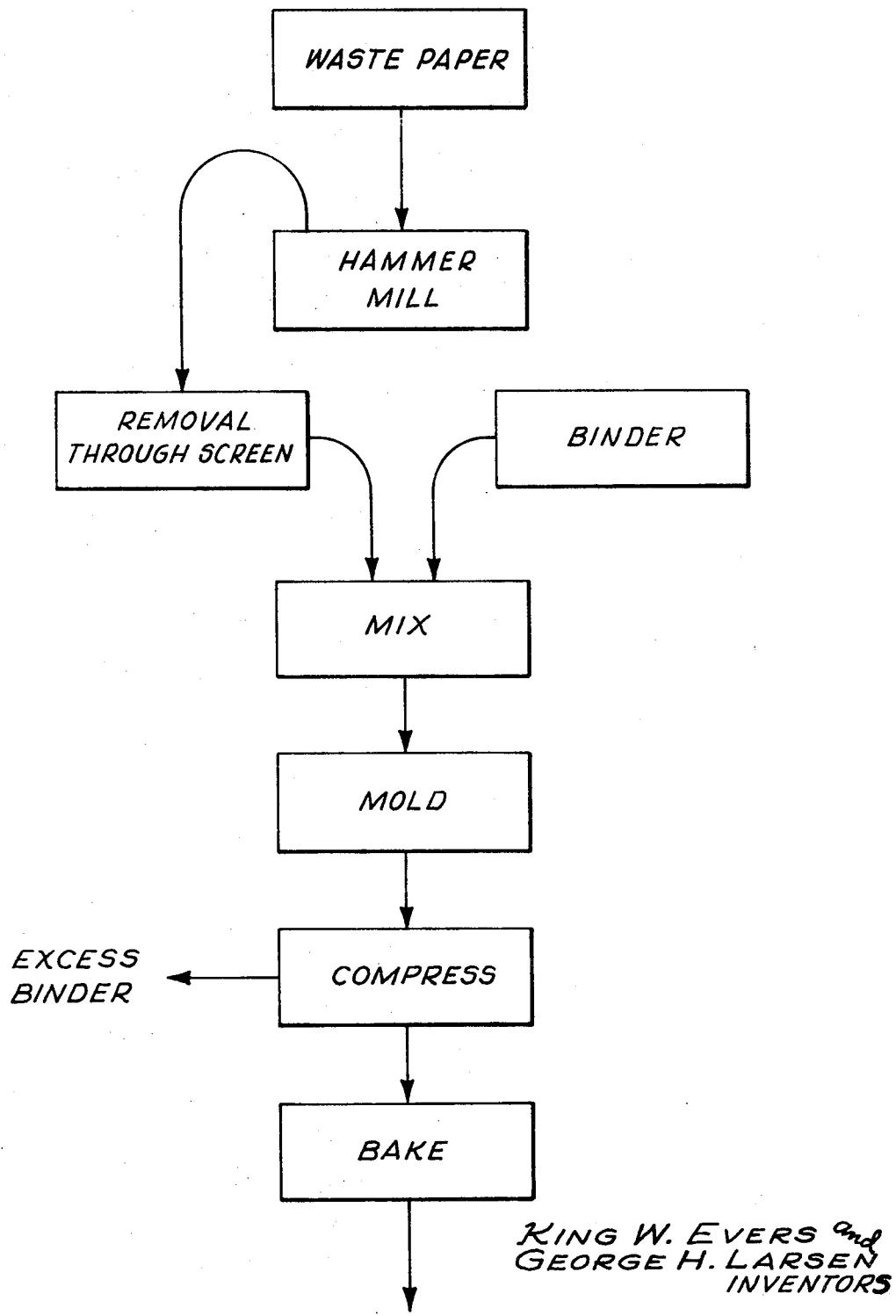

3,736,221
STRUCTURAL SHAPE BASED ON WASTE PAPER
AND METHOD OF PROVIDING THE SAME
King W. Evers, 963 Kolln St., Pleasanton, Calif. 94566,
and George H. Larsen, 761 Hayes Court, Livermore,
Calif. 94550
Filed July 29, 1971, Ser. No. 167,363
Int. Cl. B32b 5/02, 31/20
U.S. Cl. 161—170                                    9 Claims

ABSTRACT OF THE DISCLOSURE

A structural shape is provided by treating dry waste paper in a hammer mill having a peripheral speed of about 4500 feet per minute until the waste paper is reduced to individual paper fibers. The fibers are withdrawn by vacuum from the hammer mill through a screen. They are coated thoroughly with an aqueous binder, such as polyvinyl chloride, urea-formaldehyde or phenolic resin. A sufficient mass of so-coated fibers is then compressed (with release of water) under pressure of about 6000 pounds per square inch and is then baked in compressed form for six to eight hours at about 250° Fahrenheit to result in a geometrical body having a density of about 40 pounds per cubic foot. The completed body is adequately strong and is otherwise suitable for construction or building purposes.

---

Presently there is a considerable desire and need to reclaim and reuse various items presently wasted, particularly waste paper. There is simultaneously a need for building or construction materials useful in place of customary materials, such as wood, cinder blocks, cork and the like.

It is therefore an object of our invention to provide a structural shape which is based on waste paper as its prime ingredient and which is effective as a substitute for many of the building materials presently employed.

Another object of the invention is to provide a structural shape which can easily be altered by sawing and can be fastened and fastened to by nailing, bolting, by adhesives and similar techniques.

Another object of the invention is to provide a structural shape which has good acoustic insulation qualities.

A further object of the invention is to provide a structural shape that, when particularly prepared, has excellent fire resistant qualities.

An additional object of the invention is to provide a structural shape that retains its structural integrity over a long period of time.

A further object of the invention is to overcome previous difficulties with the utilization of waste paper for building purposes and to provide a satisfactory product with such a base.

A further object of the invention is in general to provide a waste paper structural shape that can readily be fabricated on machinery currently available.

A further object of the invention is to provide a structural shape based on waste paper that can readily be produced or fabricated by a straightforward method.

Other objects together with the foregoing are attained in the embodiment of the invention described in the accompanying description and by the practice of the method of the invention as outlined in the accompanying description and illustrated in the accompanying drawing, in which:

The figure is a block diagram showing the steps in the method of the invention.

In investigating the use of waste paper as the basis of a structurally sound building material, we early determined from the patent literature and otherwise that it has been customary to soak waste paper initially in various liquids in order to provide wet or aqueous pulp, which is then processed in wet form. In following such concept we have been led to a structurally weak and somewhat unpredictable product. While having some value as finish material and as acoustic insulation and the like, the product does not have sufficient structural strength for building purposes, such as bearing walls, beams and the like. We, therefore, have experimented in utilizing waste paper in initially dry form. We have left the waste paper dry, as received, and have comminuted it in dry form by putting it substantially as recived into a standard hammer mill. A typical mill is about 24 inches in diameter and is rotated at about 1500 revolutions per minute. The peripheral speed is something over 9000 feet per minute.

Dry waste paper of all sorts, such as newspaper, magazines, pamphlets, books, shipping cartons, fiberboard and the like, was indiscriminately loaded into the hammer mill and the mill was operated at the indicated speed. After a short time, a matter of a very few minutes, the waste paper was found to be comminuted into virtually individual fibers; that is, the fibers of the paper were interlocked with each other but were deprived of other, non-fibrous configurations. The result was a group of individual fibers, intertwined but individually recognizable under the microscope at about 100 magnifications. The paper is not pulped, shredded, ground or reduced to small particles, but it is processed into fibers. This effect seems to occur in appreciable amounts with presently available waste paper only above about 6000 feet per minute peripheral speed of the hammer mill.

When the separate, dry, at least partially interlocked fibers have been processed, they are withdrawn from the hammer mill by vacuum and through a screen having openings or a mesh of about three-eights of an inch. The dry, detached fibers (the fibrous material) are carried in the vacuum-induced air flow and are put into a porous container. A binder, preferably one with an aqueous base, is then thoroughly intermixed with the up-to-now dry fibers. Mixing is continued until substantially all surfaces of the separate, individual fibers are thoroughly coated with the binder.

There is a large range of binders readily available and suitable for this purpose of which we mention particularly polyvinyl chloride, urea-formaldehyde resin and phenolic resin. Aqueous solutions of any one or mixtures of these binders or of related, similar binders are suitably intermixed with the fibers from the hammer mill. One proportion that has proved satisfactory is the admixture of about 50 pounds of the dry fibers with about 5 gallons of the aqueous binder.

As an example, to 5 parts by volume of vinyl polymer there may also be added 0.5 part of a water repellant, such as chrome complex in isopropanol, or 0.5 part of sodium silicate as a fire retardant. Further, small amounts of fungicides, germicides and pest repellants can be added, depending upon ultimate use. There is a thorough intermixture of the two at atmospheric pressure and temperature. The admixed material is then placed in a porous container or mold of a suitable shape, usually a geometrical shape; for example, rectangular, to simulate the customary wooden beam.

The material in the container is then put into a press and is subjected to pressure and compaction so that the fibers are brought close to each other and so that the binder coating on and around each one of the fibers commingles with the binder coating on the other fibers and so that the pressure tends thoroughly to impregnate the fibers with binder. A suitable pressure in the press is 6000 pounds per square inch. During the compaction of the material, the excess liquid, such as water and any excess binder, is permitted to escape from the mold. We believe that should there initially be water in the fibers the binder does not displace it. This causes weakness. It is important to start with dry fibers for that reason, among others. The amount of water present with the binder does not particularly get into the fibrous material, so that good penetration by the binder occurs in the instant process. At the conclusion of the pressure operation the confined material is quite dense and relatively dry.

Then the compacted, compressed mixture in its geometrical form is subjected to a baking operation under a temperature, for example, of 250° Fahrenheit for a time from approximately six to eight hours. Any extra moisture is driven off and polymerization is carried to an appropriate extent. At the end of that time, the baking is discontinued. The cooled product is considered to be finished. It has a sharply defined geometrical shape, has a density of about 40 pounds per cubic foot, although this figure can vary widely, and is structurally strong so that it can readily be used in place of lumber, building blocks, insulation, finish paneling and the like.

While one particular density has been given as an example, it is pointed out that the density is subject to considerable variation. For example, if the geometrical shape is a panel useful primarily as a sound absorber, the density can be considerably less than for load bearing uses. The density given is often utilized but can be substantially increased for even greater strength.

Sometimes materials other than paper are used, particularly if these are fibrous and act in a fashion similar to waste paper. Sometimes, also, other materials are used, primarily as fillers or to afford different finishes and the like. The resulting product can be sawed to different shapes, will receive nails and screws appropriately, and does not easily chip or crack. Rather, it is highly homogeneous and is eminently suitable for construction. It meets various tests as follows:

|  | Solid Douglas fir | | Present product | |
| --- | --- | --- | --- | --- |
|  | Value | Rating | Value | Rating |
| Impact resistance | 100 in.-lbs | Excellent | 80 in.-lbs | Good. |
| Taber abrasion resistance (CS-17 wheel, 1 kg. load) | 200 mg., 1,000 rev. | Good | 91 mg., 1,000 rev. | Excellent. |
|  | Smoke evolution | | | |
| Heat only | 300°, 5 min | Fast, dense | 660°+, 5 min | Very fast, very dense. |
| Heat and pilot flame | 190°, 15 min | Slow, dense | 185°, 15 min | Slow, dense. |

With finished material of density about 40 lbs./cu. ft.: at 30 p.s.i. load, unit strain is about .012 inch per inch; at 2000 p.s.i. load, unit strain is about .25 inch per inch; and at 6000 p.s.i. load, unit strain is about .45 inch per inch.

The thermal conductivity of this material (K factor) is about 0.193, comparable to "Celotex" (compressed sugar cane fiber) and distinct from "Masonite" (compressed wood fiber) at 0.028.

What is claimed is:

1. A structural shape based on waste paper comprising a geometrical body primarily resulting from mixing fibers beaten from dry waste paper in the proportion of about 50 pounds and an aqueous binder in the proportion of about 5 gallons, compressing the mixture with release of water at a pressure of about 6000 pounds per square inch and baking the compressed mixture at about 250° Fahrenheit for about 6 to 8 hours, the body having a density of about 40 pounds per cubic foot.

2. A structural shape as in claim 1 in which the binder includes a polyvinyl chloride.

3. A structural shape as in claim 1 in which the binder includes a phenolic resin.

4. A structural shape as in claim 1 in which the binder includes a urea-formaldehyde resin.

5. A method of providing a structural shape based on waste paper comprising treating dry waste paper in a hammer mill, withdrawing resulting dry paper fibers from said mill through a screen, combining the withdrawn fibers with an aqueous binder resulting in a mixture, compressing the mixture into a geometrical body under about 6000 pounds per square inch pressure while permitting water to escape, and baking the compressed mixture at about 250° Fahrenheit for from about 6 to 8 hours.

6. A method as in claim 5 in which the binder includes polyvinyl chloride.

7. A method as in claim 5 in which the binder includes a phenolic resin.

8. A method as in claim 5 in which the binder includes a urea-formaldehyde resin.

9. A method as in claim 5 in which said hammer mill has a peripheral speed of about 9000 feet per minute and said screen has about a three-eights inch mesh.

References Cited

UNITED STATES PATENTS

| 2,104,996 | 1/1938 | Ives | 161—133 X |
| 3,086,253 | 4/1963 | Joa | 264—128 X |
| 3,235,530 | 2/1966 | Crouch et al. | 161—168 X |

FOREIGN PATENTS

| 973,203 | 10/1964 | Great Britain | 264—123 |

WILLIAM A. POWELL, Primary Examiner

U.S. Cl. X.R.

156—62.2; 264—115, 128